United States Patent
Kumar et al.

[11] Patent Number: 5,695,873
[45] Date of Patent: Dec. 9, 1997

[54] POLYMER-CERAMIC COMPOSITE ELECTROLYTES

[75] Inventors: Binod Kumar, Centerville; Lawrence G. Scanlon, Jr.; Jeffrey D. Schaffer, both of Fairborn, all of Ohio

[73] Assignee: The University of Dayton, Dayton, Ohio

[21] Appl. No.: 462,573

[22] Filed: Jun. 5, 1995

[51] Int. Cl.$^6$ ................................................ B32B 17/00
[52] U.S. Cl. ........................... 428/325; 428/220; 428/327; 428/329; 428/337; 428/339; 429/30; 429/33; 429/191; 429/193; 252/62.2
[58] Field of Search .................................. 428/220, 327, 428/329, 325, 337, 339; 429/33, 30, 191, 193; 252/62.2

[56] References Cited

U.S. PATENT DOCUMENTS

| | | | |
|---|---|---|---|
| H1576 | 8/1996 | Walker, Jr. | 429/192 |
| 4,824,741 | 4/1989 | Kunz | 429/26 |
| 4,828,941 | 5/1989 | Sterzel | 429/33 |
| 5,234,777 | 8/1993 | Wilson | 429/33 |
| 5,272,017 | 12/1993 | Swathirajan et al. | 429/33 |
| 5,529,707 | 6/1996 | Kejha | 252/62.2 |

OTHER PUBLICATIONS

Skaarup et al, "Mixed Phase Solid Electrolytes", *Solid State Ionics*, 28–30 (1988) pp. 975–978.
Capuano et al, "Composite Polymer Electrolytes", *J. Electrochem. Soc.*, vol. 138, No. 7, Jul. 1991.
Abraham et al, "Li$_+$-Conductive Solid Polymer Electrolytes with Liquid-Like Conductivity", *J. Electrochem. Soc.*, vol. 137, No. 5, May 1990.
Weston et al, "Effects of Inert Fillers on the Mechanical and Electrochemical Properties of Lithium Salt-Poly(ethylene oxide) Polymer Electrolytes", *Solid State Ionics* 7 (1982) pp. 75–79.
F. Croce et al, "Interfacial phenomena in polymer-electrolyte cells: lithium passivation and cycleability", *Journal of Power Sources*, 43–44 (1993) pp. 9–19.
Kumar et al, "Studies on the Composite Polymer Electrolyte of Poly(ethylene oxide) and Zeolite", Proc. Electrochem. Soc. Meeting, May 1993.
Kumar et al, "Electrochemical Performance of PEO:LiBF$_4$ and PEO:LiBF$_4$-Glass Composite Electrolytes", Proc. of the 18th International Power Sources Symp., Apr. 1993.
Alpen et al, "Ionic Conductivity in Li$_3$N Single Crystals", *Applied Physics Letters*, vol. 30, No. 12, 1977.
Sheng-Jenn Yang et al, "Electrochemical Properties of Li$_3$N Polycrystalline Electrolytes at High Temperatures", Proc. of 15th International Power Sources Symp., Sep. 1986.

*Primary Examiner*—Timothy Speer
*Attorney, Agent, or Firm*—Killworth Gottman Hagan & Schaeff LLP

[57] ABSTRACT

A polymer-ceramic composite electrolyte is provided which may be formed into a thin film having a room temperature conductivity of from $10^{-5}$ S cm$^{-1}$ to $10^{-3}$ S cm$^{-1}$. In one embodiment, the composite electrolyte comprises from about 30 to 60% by weight poly(ethylene oxide), from about 10 to 20% by weight lithium tetrafluoroborate, and from about 25 to 60% by weight lithium nitride. The film is preferably produced by mixing and grinding the components, then placing the ground mixture in a die and compacting the mixture to form a disc which is then flattened. The resulting film is annealed to ensure high conductivity at room temperature.

10 Claims, 5 Drawing Sheets

POLYMER-CERAMIC COMPOSITE ELECTROLYTES

BACKGROUND OF THE INVENTION

The present invention relates polymer-ceramic composite electrolytes, and more particularly to a polymer-ceramic composite electrolyte film formed from a mixture of poly (ethylene oxide) and lithium borofluorate (LiBF$_4$) enhanced with a ceramic material, films of which exhibit high conductivity at room temperature.

Widespread interest has existed in the use of solid polymer electrolytes for use in lightweight, rechargeable high-energy-density batteries and other high-energy-density power sources. Such solid polymer electrolytes generally consist of a polymer solvent complexed with a lithium salt. However, the conductivity of such electrolytes is marginal for many applications. In addition, such electrolytes possess low cationic transport numbers and exhibit poor interfacial stability with lithium electrodes.

Polymer-ceramic composite electrolytes are a known subclass of solid polymer electrolytes. They are formed by incorporating a ceramic material in the polymer matrix to enhance conductivity. For example, ceramic additives such as Al$_2$O$_3$, LiAlO$_2$, SiO$_2$, and zeolite have been used in small amounts to increase the room temperature conductivity of composite electrolytes. See Capuano et al, "Composite Polymer Electrolytes", *J. Electrochem. Soc.* 138, 1918 (1991) which teaches the incorporation of $\gamma$-Al$_2$O$_3$ and LiAlO$_2$ in a poly(ethylene oxide) polymer.

The use of lithium nitride (Li$_3$N) has also been proposed for use in composites as it has an high ionic conductivity at ambient temperatures of the order of about 10$^{-3}$ S cm$^{-1}$. See Skaarup et al, "Mixed Phase Solid Electrolytes", *Solid State Ionics*, 28–30, 975 (1988), which teaches a polymer composite containing Li$_3$N. However, while the incorporation of ceramic materials in composite electrolytes results in increased conductivity as compared with solid polymer electrolytes, such increases have been relatively marginal, even when such electrolytes have been subjected to low temperature annealing. In addition, the processing of such polymer-ceramic composite electrolytes in thin film applications has been limited due to the brittleness of lithium nitride.

Accordingly, there is still a need in the art for a polymeric-ceramic composite electrolyte film which has a high conductivity at room temperature, which may be produced as a thin film, and which may be used in a variety of electrochemical applications.

SUMMARY OF THE INVENTION

The present invention meets those needs by providing a polymeric-ceramic composite electrolyte which may be formed into a thin film for use in a variety of electrochemical applications including lithium batteries. The film has a high conductivity at room temperature and exhibits good lithium interfacial stability.

According to one aspect of the present invention, a polymer-ceramic composite electrolyte is provided comprising from about 30 to 60% by weight poly(ethylene oxide), from about 10 to 20% by weight lithium tetrafluoroborate (LiBF$_4$), and from about 25 to 60% by weight lithium nitride (Li$_3$N).

In one embodiment of the invention, the composite electrolyte comprises 45% by weight poly(ethylene oxide), 15% by weight lithium tetrafluoroborate, and 40% by weight lithium nitride. In an alternative embodiment, the composite electrolyte comprises 30% by weight poly(ethylene oxide), 10% by weight lithium tetrafluoroborate, and 60% by weight lithium nitride.

Preferably, the polymer-ceramic composite electrolyte of the present invention is in the form of a thin film which has been annealed such that the film has a room temperature conductivity of the order of about 10$^{-5}$ S cm$^{-1}$ to 10$^{-3}$ S cm$^{-1}$. By room temperature conductivity, it is meant that the film exhibits high conductivity at temperatures ranging from about −40° to 40° C. The film is preferably from about 0.07 to 0.15 mm thick.

In an alternative embodiment of the invention, a polymer-ceramic composite electrolyte film is provided which comprises from about 30 to 60% by weight of a polymer selected from the group consisting of poly(ethylene oxide), poly(propylene oxide), and polyacrylonitrile, from about 10 to 20% by weight lithium tetrafluoroborate, and from about 25 to 60% by weight of a ceramic material selected from the group consisting of Li$_3$N, Al$_2$O$_3$, SiO$_2$, BN, Si$_3$N$_4$, CaO, MgO, and SiC. The film has preferably been annealed at a temperature of from about 50° to 100° C. above the melting point of the polymer.

In this embodiment, the film preferably comprises poly(ethylene oxide) and has preferably been annealed at a temperature of from 125°–145° C. The film preferably has a room temperature conductivity of the order of about 10$^{-5}$ S cm$^{-1}$ to 10$^{-3}$ S cm$^{-1}$ and is about 0.07–0.15 mm thick.

The present invention also provides a process for forming a polymer-ceramic composite electrolyte film comprising the steps of providing from about 30 to 60% by weight poly(ethylene oxide), from about 10 to 20% by weight lithium tetrafluoroborate, and from about 25 to 60% by weight lithium nitride to form a mixture. Preferably, the ratio of oxygen to lithium in the poly(ethylene oxide) and the lithium tetrafluoroborate is 8:1.

The mixture is then ground and placed in a die where the mixture is compacted at a temperature of from about 80°–125° C. and a pressure of from about 1,000 to 20,000 psig to form a composite disc. The disc is then flattened so as to form a film. The polymer-ceramic composite electrolyte film produced by the process of the present invention is preferably from about 0.07–0.15 mm thick.

In order to obtain a high conductivity at room temperature, the process preferably further includes the step of annealing the film at a temperature of from 90° to 145° C, and may include the step of further annealing the film at a temperature of from 90° to 145° C. After annealing, the film has a room temperature conductivity of the order of about 10$^{-5}$ S cm$^{-1}$ to 10$^{31\ 3}$ S cm$^{-1}$.

The resulting polymer-ceramic composite electrolyte film may be used in a number of applications including lithium batteries, electrochemical sensors, and electrochromic devices.

Accordingly, it is a feature of the present invention to provide a polymer-ceramic composite electrolyte which may be formed into a thin film having a high conductivity at room temperature, and which may be used in a number of electrochemical applications. This, and other features and advantages of the present invention will become apparent from the following detailed description, the accompanying drawings, and the appended claims.

DETAILED DESCRIPTION OF THE PREFERRED EMBODIMENT

Figure 1:
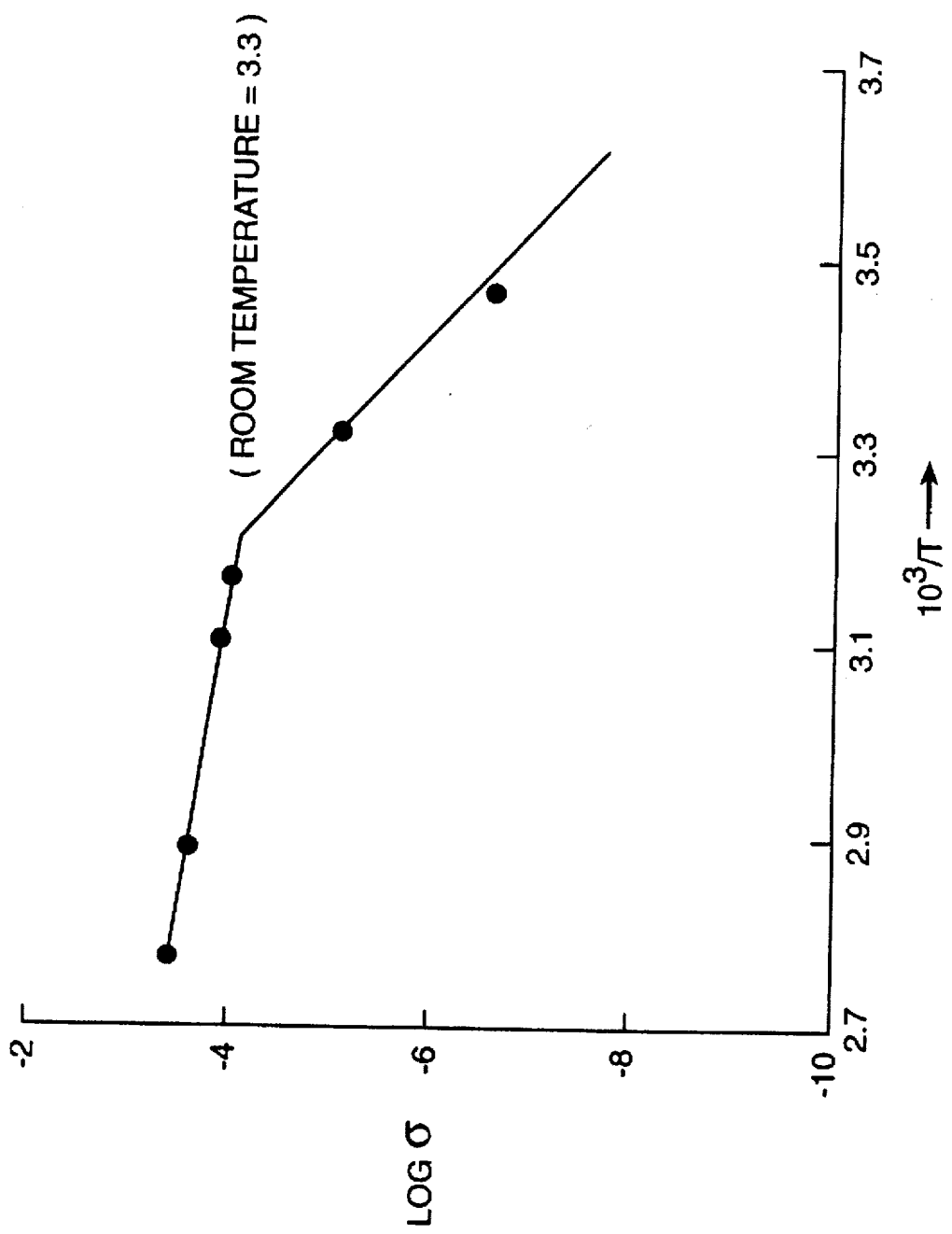
FIG. 1 is a graph illustrating the conductivity measurements obtained for the polymeric-ceramic composite electrolyte film of the present invention containing 40% by weight Li$_3$N.

The polymer-ceramic composite electrolyte of the present invention provides many advantages over previously used solid polymer electrolytes and polymer-ceramic composite electrolytes. The use of a ceramic material such as lithium nitride provides a high conductivity while the polymer component allows the electrolyte to be fabricated into a thin film for use in batteries and other devices. In addition, the conductivity of the resulting film is significantly increased by annealing the film after its formation. The resulting composite electrolyte films exhibit improved lithium electrolyte interfacial stability and thus may be used effectively in commercial rechargeable lithium batteries, electrochemical sensors and a number of electrochromic devices.

The polymer component is preferably poly(ethylene oxide), which comprises from 30 to 60% by weight of the composite and is available from Aldrich Chemical, for example. Other suitable polymer components include poly (propylene oxide) and polyacrylonitrile. The polymer component chosen should be a polymer having a moderate ionic conductivity.

Lithium tetrafluoroborate, which preferably comprises from about 10 to 20% by weight of the composite, is also available from Aldrich Chemical. Preferably, the ratio of oxygen to lithium in the poly(ethylene oxide) and lithium tetrafluoroborate complex is maintained at about 8:1.

The lithium nitride preferably comprises 25 to 60% by weight of the composite, and is available from Johnson Matthey. Other ceramic materials suitable for use in the present invention include $Al_2O_3$, $SiO_2$, BN, $Si_3N_4$, CaO, MgO, and SiC.

In the process of the present invention, the poly(ethylene oxide), lithium tetraflouoroborate, and lithium nitride are mixed and ground. Depending on the consistency desired, the components may be ground by hand using a mortar and pestle, or with the use of a machine such as a micropulverizer. The ground mixture is placed in a die, preferably between two teflon films. The ground mixture is then compacted by placing the die in a press at temperatures ranging from 80° to 125° C. The pressure may be varied from 1,000 to 20,000 psig. After compacting the mixture, the die is removed from the press and allowed to cool. The compacted composite disc is then removed, and then flattened with a roller by placing the disc on a hot plate between two sheets of teflon. The resulting electrolyte film preferably has a thickness of 0.07 to 0.15 mm.

The film is then annealed to enhance conductivity. We have found that annealing the film at a temperature of from 90° to 145° C. for periods ranging from 12 to 72 hours results in a significant increase in conductivity. Additional annealing for shorter or longer periods of time have also been found to significantly increase conductivity. It should be appreciated that the aforementioned annealing temperatures and times may be varied so as to optimize the resulting conductivity. For example, the use of low temperature annealing at temperatures ranging from 90° to 125° C. for periods of time less than 50 hours has been found to only slightly increase conductivity while significant increases in conductivity have been found to occur by annealing for longer periods of time (greater than 50 hours) in the 90°–125° temperature range or at higher annealing temperatures (125° to 145° C.) for shorter time periods. It may also be possible to anneal at temperatures greater than 145° C. for shorter periods of time.

Factors that should be considered when selecting annealing conditions include the melting point of poly(ethylene oxide) (68° C.) and lithium (180° C.), the volume fraction of lithium nitride, and the thickness of the electrolyte film. The film is preferably annealed at 50° to 100° C. above the melting point of the chosen polymer. After annealing, the polymer-ceramic composite electrolyte film has a room temperature conductivity of the order of about $10^{-5}$ S cm$^{-1}$ to $10^{-3}$ S cm$^{-1}$.

In addition to its high conductivity, the polymer-ceramic composite electrolyte film of the present invention has been found to exhibit good interfacial stability when used in a lithium rechargeable battery. This is an improvement over prior art electrolytes, which tend to passivate lithium due to the extreme reactivity of the lithium metal.

The polymer-ceramic composite electrolyte film also has a higher cationic transport number than that of solid polymer electrolytes. This is because the motions of polymer chains in solid polymer electrolytes contribute to the transport of lithium cation as well as the anionic species. As a result, when such electrolytes are used in a battery, extensive concentration gradients are set up during use which adversely affect the battery's electrical performance. However, the addition of a ceramic phase as in the present invention suppresses the chain motion and increases the transport of the lithium cation which results in an enhanced cationic transport number.

In order that the invention may be more readily understood, reference is made to the following examples, which are intended to be illustrative of the invention, but are not intended to be limiting in scope.

EXAMPLE 1

A composite film in accordance with the present invention was prepared using reagent grade poly(ethylene oxide) (PEO), lithium tetrafluoroborate ($LiBF_4$) and lithium nitride ($Li_3N$). The ratio of oxygen to lithium in the PEO:$LiBF_4$ complex was maintained at 8:1 such that the mixture contained 45% by weight PEO, 15% by weight $LiBF_4$, and 40% by weight $Li_3N$. Initially, these components were mixed and ground by micropulverizing the components in a Brinkmann Model Retsch micropulverizer. The PEO was introduced in small portions in order to prevent the massive aggregation of the batch materials during the grinding operation. A portion of the ground mixture was placed in a die between two teflon films. The ground mixture in the die was then compacted in a Carver Press at temperatures ranging from 80° to 125° C. for about 10 minutes. The pressure was varied from 1,000 to 20,000 psig. After compacting the mixture, the die was removed from the press and allowed to cool for about 20 minutes. The compacted composite disc was then removed, and then flattened with a roller by placing the disc on a hot plate between two sheets of teflon. The resulting electrolyte film had a thickness of 0.1 mm.

The film was then annealed at 125° C. overnight. After annealing the film, electrochemical measurements were conducted in the temperature range of 0°–100° C. using EG&G Electrochemical System (Model 273A) interfaced with an IBM-compatible computer. FIG. 1 illustrates the conductivity vs. temperature measurements of the resulting film.

Figure 2:
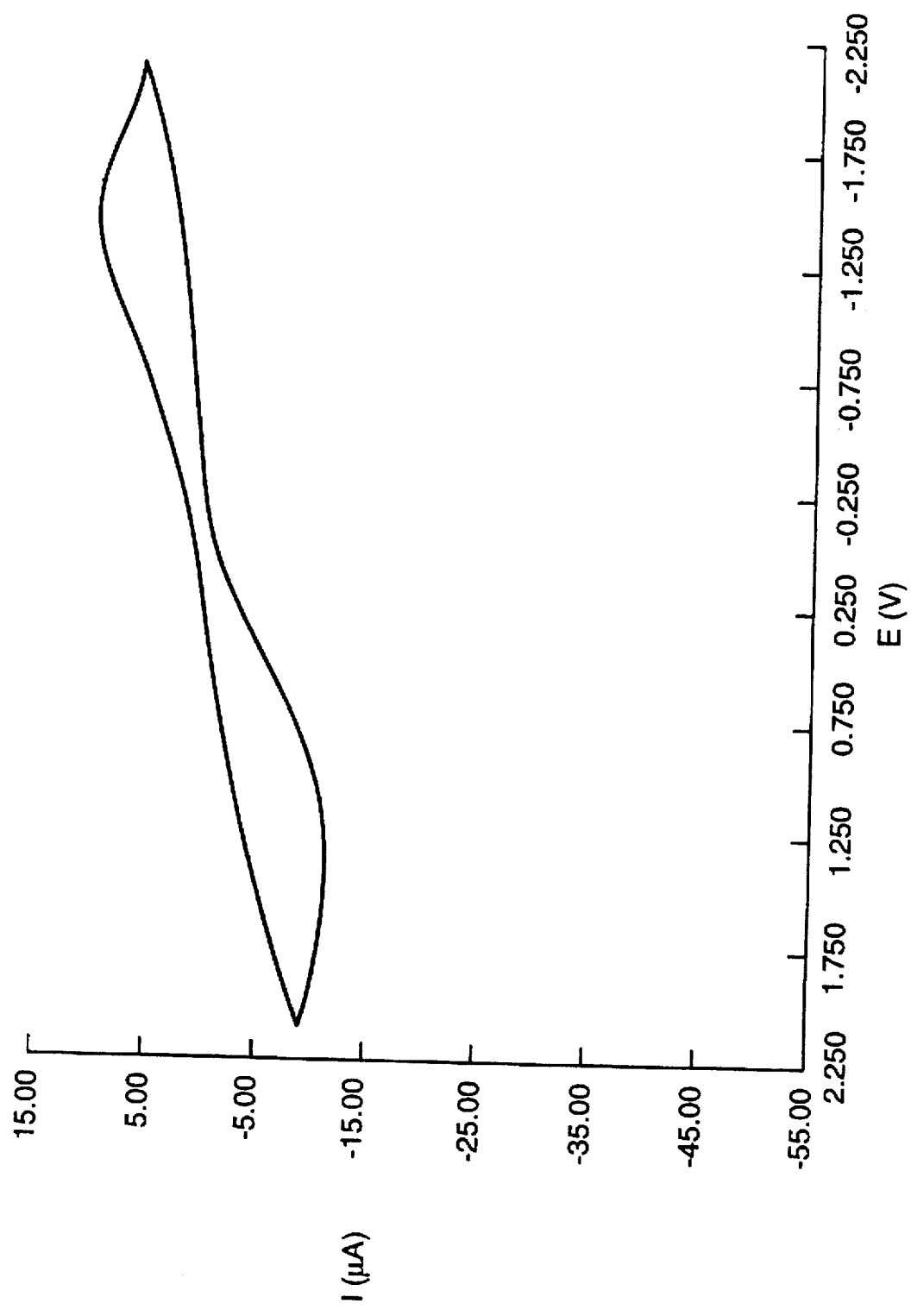
FIG. 2 is a voltammogram illustrating the interfacial stability of an Li/composite electrolyte/Li cell containing 40% by weight $Li_3N$.

A symmetric cell with an Li/composite electrolyte/Li configuration was constructed from the electrolyte produced above. A cyclic voltammogram of the cell at 30.2° C. is shown in FIG. 2. The voltammogram does not indicate any voltage instability of the electrolyte or secondary electrode reactions between the electrolyte and lithium.

EXAMPLE 2

Figure 3:
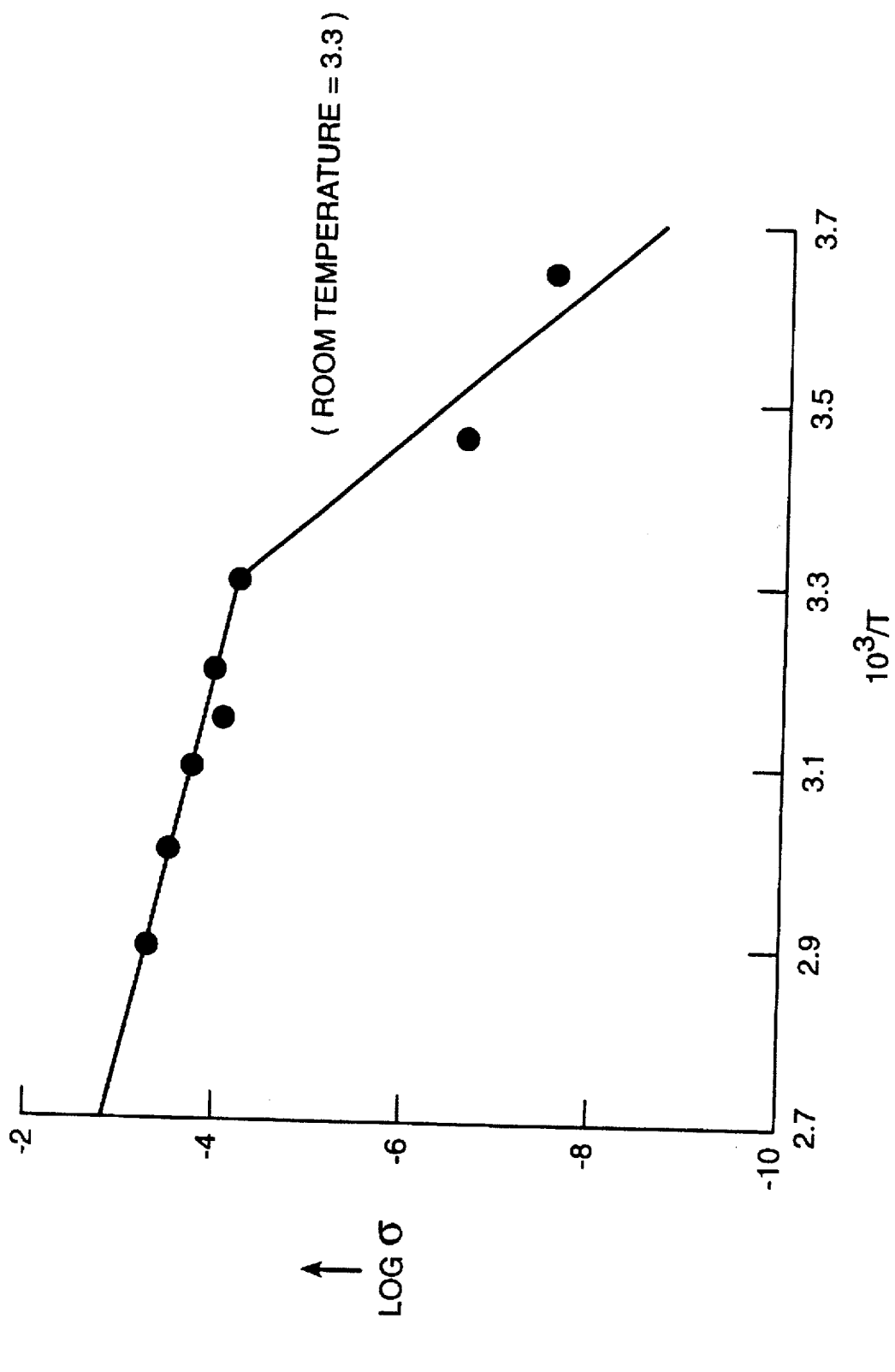
FIG. 3 is a graph illustrating the conductivity measurements obtained for a polymeric-ceramic composite electrolyte film containing 60% by weight $Li_3N$.
Figure 4:
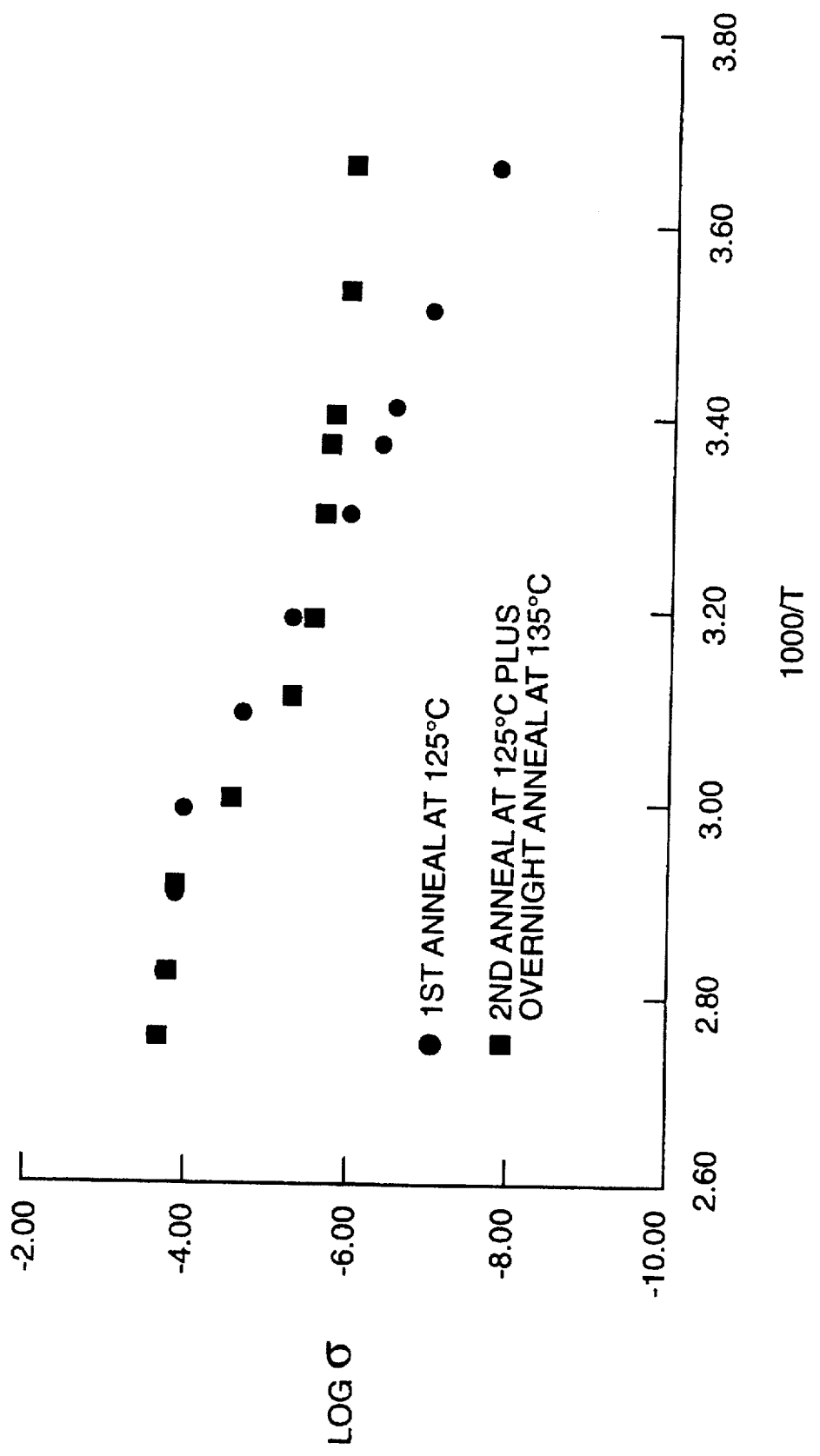
FIG. 4 is a graph illustrating the effects of annealing on conductivity for a polymeric-ceramic composite electrolyte film containing 60% by weight $Li_3N$.

A polymer-ceramic composite electrolyte film was produced as in example 1 comprising 60% by weight $Li_3N$, 30% by weight PEO, and 10% by weight $LiBF_4$. FIG. 3 shows the conductivity data obtained for the composite after annealing at 125° C. FIG. 4 illustrates the conductivity obtained for the film after annealing at 125° C. and than after additional annealings at 125° C. overnight and 135° C. overnight. As can be seen, additional annealing results in higher conductivity at lower temperatures.

Figure 5:
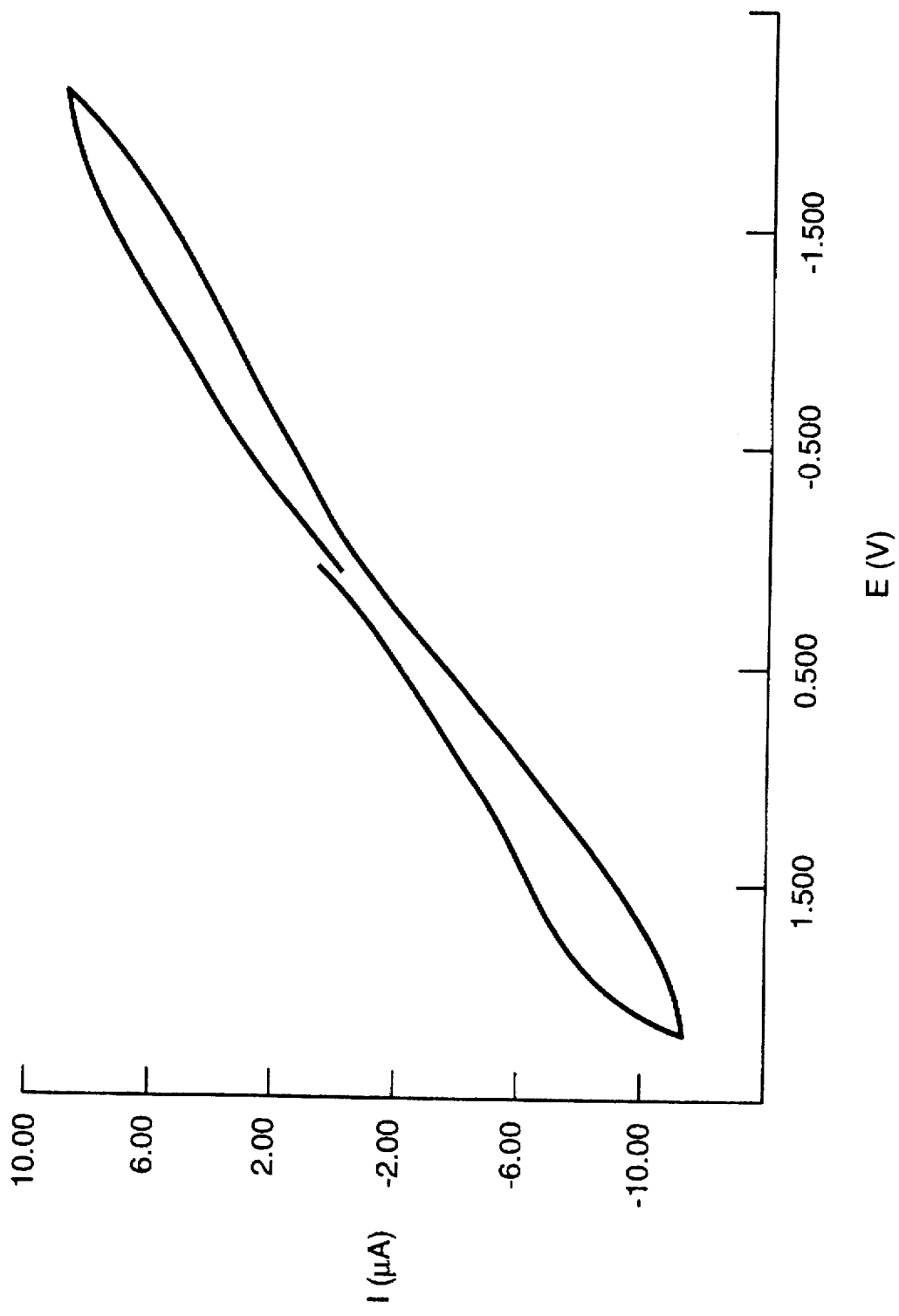
FIG. 5 is a voltammogram illustrating the interfacial stability of an Li/composite electrolyte/Li cell containing 60% by weight $Li_3N$.

A cyclic voltammogram of an Li/composite electrolyte/Li cell at 25° C. is shown in FIG. 5. Again, the voltammogram is symmetric and does not show any instability or secondary peaks.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A polymer-ceramic composite electrolyte comprising from about 30 to 60% by weight poly(ethylene oxide), from about 10 to 20% by weight lithium tetrafluoroborate, and from about 25 to 60% by weight lithium nitride.

2. The polymer-ceramic composite electrolyte of claim 1 in which said composite electrolyte comprises 45% by weight poly(ethylene oxide), 15% by weight lithium tetrafluoroborate, and 40% by weight lithium nitride.

3. The polymer-ceramic composite electrolyte of claim 1 in which said composite electrolyte comprises 30% by weight poly(ethylene oxide), 10% by weight lithium tetrafluoroborate, and 60% by weight lithium nitride.

4. The polymer-ceramic composite electrolyte of claim 1 in which said composite electrolyte is in the form of a film.

5. The polymer-ceramic composite electrolyte of claim 4 wherein said film has been annealed.

6. The polymer-ceramic composite electrolyte of claim 5 in which said film is from about 0.07–0.15 mm thick.

7. The polymer-ceramic composite electrolyte of claim 6 in which said film has a room temperature conductivity of the order of about $10^{-5}$ S cm$^{-1}$ to $10^{-3}$ S cm$^{-1}$.

8. A polymer-ceramic composite electrolyte film comprising from about 30 to 60% by weight of a polymer selected from the group consisting of poly(ethylene oxide), poly(propylene oxide), and polyacrylonitrile, from about 10 to 20% by weight lithium tetrafluoroborate, and from about 25 to 60% by weight of a ceramic material selected from the group consisting of $Li_3N$, $Al_2O_3$, $SiO_2$, BN, $Si_3N_4$, CaO, MgO, and SiC, wherein said film has been annealed at a temperature of about 50° to 100° C. above the melting point of said polymer, and wherein said annealed film has a room temperature conductivity of the order of about $10^{-5}$ S cm$^{-1}$ to $10^{31\ 3}$ S cm$^{-1}$.

9. The polymer-ceramic composite electrolyte film of claim 8 wherein said polymer is poly(ethylene oxide) and said film has been annealed at a temperature of from 125° to 145° C.

10. The polymer-ceramic composite electrolyte film of claim 8 in which said film is from about 0.07–0.15 mm thick.

* * * * *